United States Patent
Andreasch et al.

(10) Patent No.: US 8,649,103 B2
(45) Date of Patent: Feb. 11, 2014

(54) ADAPTIVE LENS SYSTEM

(75) Inventors: Wolfgang Andreasch, Weinstadt (DE);
Dieter Burger, Vaihingen (DE);
Andreas Enzmann,
Villingen-Schwenningen (DE); Florian Sepp, Altenstadt (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 0 days.

(21) Appl. No.: 13/565,893

(22) Filed: Aug. 3, 2012

(65) Prior Publication Data
US 2013/0003188 A1    Jan. 3, 2013

Related U.S. Application Data

(63) Continuation of application No. PCT/EP2011/050672, filed on Jan. 19, 2011.

(30) Foreign Application Priority Data

Feb. 3, 2010 (DE) .......................... 10 2010 001 551

(51) Int. Cl.
*G02B 1/06* (2006.01)
*G02B 7/02* (2006.01)

(52) U.S. Cl.
USPC .......................................... 359/666; 359/824

(58) Field of Classification Search
USPC .................. 359/665–667, 824, 825
See application file for complete search history.

(56) References Cited

U.S. PATENT DOCUMENTS

| | | | | |
|---|---|---|---|---|
| 5,541,776 A | * | 7/1996 | Kobayashi et al. | 359/665 |
| 6,188,526 B1 | * | 2/2001 | Sasaya et al. | 359/666 |
| 2008/0259463 A1 | * | 10/2008 | Shepherd | 359/666 |
| 2009/0052049 A1 | | 2/2009 | Batchko et al. | |

FOREIGN PATENT DOCUMENTS

| | | |
|---|---|---|
| EP | 1837696 A1 | 9/2007 |
| GB | 2422206 A | 7/2006 |
| JP | 9049904 A | 2/1997 |
| JP | 2007222902 A | 9/2007 |
| WO | WO2007017089 A1 | 2/2007 |

OTHER PUBLICATIONS

International Search Report for corresponding PCT Application No. PCT/EP2011/050672, mailed Mar. 10, 2011, 6 pages.
Notification of Transmittal of copies of translation of the International Preliminary Report on Patentability for corresponding PCT Application No. PCT/EP2011/050672, mailed Aug. 16, 2012, 6 pages.

* cited by examiner

*Primary Examiner* — Scott J Sugarman
(74) *Attorney, Agent, or Firm* — Fish & Richardson P.C.

(57) ABSTRACT

An adaptive lens system for laser materials processing, for example, in the high-power range of at least approximately 1 kW, includes two deformable lens surfaces spaced apart from each other in the direction of the optical axis, a chamber formed between the two lens surfaces and filled with a fluid, and a device for changing the distance between the two lens surfaces along the optical axis.

10 Claims, 1 Drawing Sheet

ADAPTIVE LENS SYSTEM

CROSS REFERENCE TO RELATED APPLICATIONS

This application is a continuation of and claims priority under 35 U.S.C. §120 to PCT Application No. PCT/EP2011/050672 filed on Jan. 19, 2011, which claims priority to German Application No. 10 2010 001 551.2, filed on Feb. 3, 2010. The contents of both of these priority applications are hereby incorporated by reference in their entirety.

TECHNICAL FIELD

This invention relates to an adaptive lens system for laser materials processing, for example in the high-power range of at least approximately 1 kW.

BACKGROUND

Adaptive optical systems in the form of adaptive mirrors for $CO_2$ or Nd:YAG lasers are known, with which corrections to the focus position and beam diameter of a laser beam can be carried out in real time, in order, for example, to permit a controlled laser processing of workpieces. Adaptive mirrors can include a deformable mirrored plate that is rapidly and specifically deformed by a piezo actuator so that the focal length of the adaptive mirror can be continuously adjusted. The mirrored plates are available with a highly reflective coating for $CO_2$ lasers (10.6 µm) or for Nd:YAG lasers (1.06 µm).

SUMMARY

Adaptive optical systems, in particular for those wavelengths for which there is no highly reflective coating, as described herein include an adaptive lens system having two deformable lens surfaces spaced apart from each other in the direction of a common optical axis, a chamber formed between the two lens surfaces and filled with a fluid, and a device for changing the distance between the two lens surfaces along the optical axis.

The chamber volume enclosed between the two lens surfaces is filled up by a fluid (optically) transparent to the laser radiation. By moving at least one of the two lens surfaces relative to the other lens surface, the spacing at the moved regions changes locally, and hence also the volume that is available for the fluid. As a result, in the event of a reduction in the local distance between the two lens surfaces, the pressure of the fluid on the lens surfaces increases, whereby these are elastically deformed. In the described case of pressure increase, the lens surfaces develop a convex contour, the result being that the focus position of the laser beam passing through the adaptive lens system undergoes a change. If the two lens surfaces are clamped at the edges symmetrically with respect to the optical axis, then the pressure change in the fluid is introduced onto the lens surfaces symmetrically with respect to the optical axis.

To compensate for thermally induced thermal expansions, the chamber with the fluid can be connected to a pressure-compensation element (e.g., a pressure-compensation vessel) so that low-frequency changes in volume and pressure are compensated and the focus position remains stable. In addition to the actual pressure compensation, which is effected passively, the pressure can also be actively controlled via the pressure-compensation vessel by activating the same. This can be used to shape the lens surfaces at low frequencies or when static. The focus position can be adjusted by this means when no high-frequency focus oscillations are required.

High-frequency changes in volume caused by oscillating movements of the device for changing the distance between the two lens surfaces result in a high-frequency focus oscillation. Furthermore, an average fluid pressure enables an average focus position of the laser beam to be set at the workpiece, around which the focus position oscillates as required.

The change in distance between the two lens surfaces can be effected by means of a piezoelectric actuator, which can be embodied in the form of a ring actuator to facilitate a uniform application of pressure with respect to the optical axis and hence an axially symmetrical contouring of the lens surfaces.

The ring actuator can be arranged on an outer face facing away from the chamber of one of the two lens surfaces or on the inner face facing the chamber of one of the two lens surfaces; in the first case, a positive pressure can be generated in the chamber, thus enabling the two lens surfaces to assume a convex curvature, and in the latter case a negative pressure can be generated in the chamber, thus enabling the two lens surfaces to assume a concave curvature.

In some cases, at least two ring actuators are provided, one of which is arranged on an outer face facing away from the chamber of one of the two lens surfaces, and the other of which is arranged on an inner face facing the chamber of one of the two lens surfaces. This measure enables either a positive pressure or a negative pressure to be set in the chamber and hence either a convex or a concave curvature of the two lens surfaces can be achieved.

In some embodiments, the lens surfaces are in the form of plane-parallel plates, which are elastically deformed at a positive or negative pressure in the chamber, and when no pressure is applied—in their "position at rest"—exert no (or only slight) influence on the beam guidance and shaping of the laser beam. In certain embodiments, by virtue of a suitable contouring, the lens surfaces are involved in the beam guidance from the outset, that is, even in their unpressurized state or position at rest.

The lens surfaces can be made of a material that is (optically) transparent to laser radiation, for example, glass, with a damage threshold adapted to the laser power.

The adaptive lens systems described herein are suitable, for example, for the fundamental wavelengths of solid-state lasers, that is, wavelengths in the range of approximately 1 µm. Moreover, the adaptive lens systems are also suitable for harmonics of these fundamental wavelengths (frequency conversion).

In some implementations, the lens surfaces each have on the outer face thereof facing away from the chamber and/or on the inner face thereof facing the chamber a different coating, which maximizes or increases the transmission at the transition of the particular media to one another.

Further advantages are apparent from the claims, the description, and the drawings. The features mentioned above and listed below may also be used alone or jointly in any combination. The embodiments illustrated and described are not to be understood as an exhaustive list, but rather as examples.

DETAILED DESCRIPTION

Figure 1:
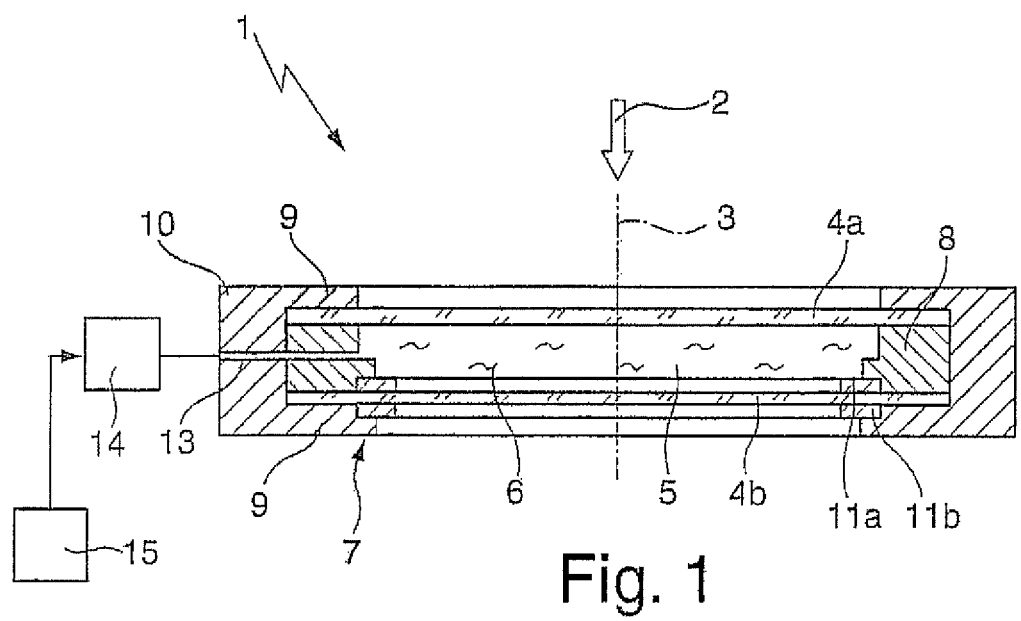
FIG. 1 shows a longitudinal section through an adaptive lens system.

The adaptive lens system 1 shown in FIG. 1 serves to adapt and vary the focus position of a laser beam 2, for example, in the field of laser materials processing in the high-power range of at least approximately 1 kW.

The adaptive lens system 1 includes two deformable lens surfaces 4a, 4b spaced apart from each other in the direction of the optical axis 3, a chamber 5 formed between the two lens surfaces 4a, 4b and filled with a fluid 6 (for example, on a silicone oil basis) transparent to the laser radiation, and also a device 7 for changing the spacing of the two lens surfaces 4a, 4b relative to each other along the optical axis 3. The two lens surfaces 4a, 4b are made of a material (e.g., glass) transparent to the laser radiation with a damage threshold adapted to the laser power, and may be in the form, for example, of plane parallel plates.

The two lens surfaces 4a, 4b and an intermediate ring 8 arranged therebetween are axially clamped at the edge between two annular shoulders 9 of a housing (ring mounting) 10 and at the same time are sealed against each other via seals. The chamber 5 is therefore defined by the two lens surfaces 4a, 4b and the intermediate ring 8. The device 7 for changing the distance between the two lens surfaces 4a, 4b includes two piezoelectric ring actuators 11a, 11b acting in the axial direction, which are provided on both sides of the lens surface 4b lowermost in FIG. 1 and the axial length of each of which increases if they are actuated. The ring actuator 11a uppermost in FIG. 1 is arranged inside the chamber 5 on the inner face facing the chamber 5 of the lower lens surface 4b and is supported at an annular shoulder of the intermediate ring 8. The lower ring actuator 11b is arranged on the outer face facing away from the chamber 5 of the lower lens surface 4b and is supported at an annular shoulder of the housing 10.

By actuating the upper ring actuator 11a, the upper lens surface 4a can be moved or deflected axially outwards (downwards in FIG. 1) at the edge relative to the lower lens surface 4b, and by actuating the lower ring actuator 11b, the upper lens surface 4a can be moved or deflected axially inwards (upwards in FIG. 1) relative to the lower lens surface 4b. Owing to this local movement or deflection of the lower lens surface 4b, the local distance thereof from the upper lens surface 4a changes in this region and hence the volume available for the fluid 6 changes. If the local distance between the two lens surfaces 4a, 4b decreases, the pressure of the fluid on the lens surfaces 4a, 4b increases as a result, whereby they deform elastically outwards and each form a convex lens contour. If the local distance between the two lens surfaces 4a, 4b increases, the pressure of the fluid on the lens surfaces 4a, 4b decreases, whereby they deform elastically inwards and each form a concave lens contour.

In both cases the laser beam 2 passing through the adaptive lens system 1 undergoes a change in the focus position thereof. Since the two lens surfaces 4a, 4b and the ring actuators 11a, 11b are clamped symmetrically with respect to the optical axis 3, a pressure change in the fluid causes a deformation of the two lens surfaces 4a, 4b symmetrically with respect to the optical axis 3. A reduction in the pressure does not necessarily result in a concave deformation, since, for example, a previously effected convex curvature will just be reduced. Only when a negative pressure is reached will a concave deformation occur or when the tension ratios produce said deformation.

Figure 2:
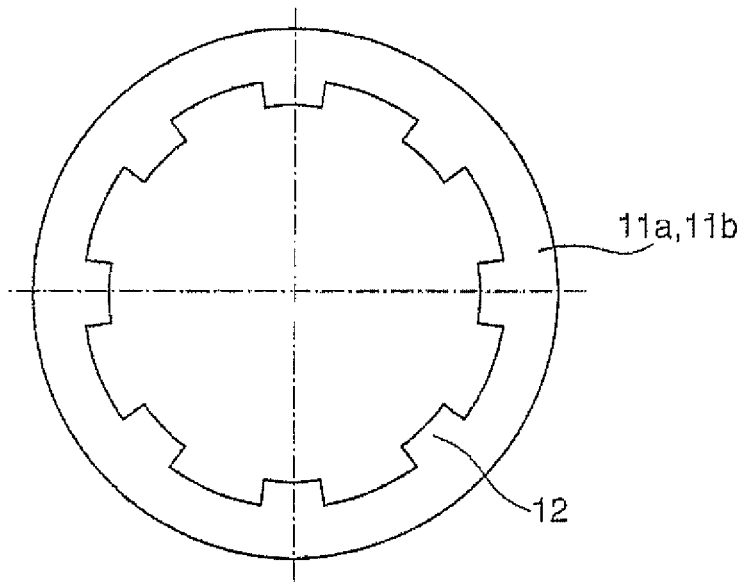
FIG. 2 shows a plan view onto a piezoelectric ring actuator of FIG. 1.

As shown in FIG. 2, the ring actuators 11a, 11b each have inwardly protruding projections 12, with which the lower lens surface 4b is deflected axially.

To compensate for thermally induced expansion, the chamber 5 containing the fluid 6 is connected via an inlet pipe 13 to a pressure-compensation element 14, as is known to a person skilled in the art from a wide range of applications. The pressure-compensation element 14 may be, for example, a pressure-compensation vessel, that has two chambers separated by a membrane, one of which is filled with a gas and the other of which contains a fluid. The fluid-filled chamber is connected via the inlet pipe 13 to the chamber 5 formed by the lens surfaces 4a, 4b and the intermediate ring 8, so that on the strength of the relatively long response time in the pressure-compensation vessel for pressure build-up and pressure drop, low-frequency changes in volume and pressure are compensated and the focus position remains stable.

In addition, the pressure-compensation element 14 is controlled via a control unit 15, so that in this way the pressure in the chamber 5, and hence the curvature of the lens surfaces 4a, 4b, can be actively adjusted. This enables a rest position to be defined and, starting therefrom, further focus position changes can be carried out, which can be regarded as starting or average positions. High-frequency focus position oscillations can then be superimposed thereon by way of corresponding actuators.

Additionally or alternatively, one or two ring actuators may be arranged at the upper lens surface 4a.

Furthermore, the two lens surfaces 4a, 4b may have on the outer face thereof facing away from the chamber 5 and/or on the inner face thereof facing the chamber 5 a different coating, which increases or maximizes the transmission at the transition of the particular media to one another, such as air to glass, glass to fluid, fluid to glass and glass to air.

Other Embodiments

A number of embodiments have been described. Nevertheless, it will be understood that various modifications may be made without departing from the spirit and scope of this disclosure. Accordingly, other embodiments are within the scope of the following claims.

What is claimed is:

1. An adaptive lens system for laser materials processing, the adaptive lens system comprising:
a first deformable lens and a second deformable lens spaced apart from each other in the direction of a common optical axis;
a chamber defined between a first surface of the first deformable lens and a first surface of the second deformable lens; and
a device operable to change the distance, along the optical axis, between the first surface of the first deformable lens and the first surface of the second deformable lens, thereby changing a pressure in the chamber and deforming the first deformable lens and the second deformable lens, wherein the device comprises a first piezoelectric ring actuator arranged on the first surface of the first deformable lens and a second piezoelectric ring actuator arranged on a second surface of the first deformable lens located opposite the first surface of the first deformable lens.

2. The adaptive lens system according to claim 1, wherein the chamber contains a fluid, and the fluid contacts the first surface of the first deformable lens and the first surface of the second deformable lens.

3. The adaptive lens system according to claim 1, wherein the chamber is sealed.

4. The adaptive lens system according to claim 1, further comprising a pressure-compensation element coupled to the chamber.

5. The adaptive lens system according to claim 4, wherein the pressure-compensation element is configured to compensate low-frequency changes in pressure.

6. The adaptive lens system of claim 1, wherein the first deformable lens comprises a planar plate or a curved plate, the second deformable lens comprises a planar plate or a curved plate, or the first deformable lens and the second deformable lens each comprises a planar plate or a curved plate.

7. The adaptive lens system of claim 1, wherein the first deformable lens comprises a material transparent to laser radiation, the second deformable lens comprises a material transparent to laser radiation, or the first deformable lens and the second deformable lens each comprises a material transparent to laser radiation.

8. The adaptive lens system of claim 7, wherein the material transparent to laser radiation comprises glass.

9. The adaptive lens system of claim 7, wherein a damage threshold of the material is adapted to the laser power.

10. The adaptive lens system of claim 1, wherein the first piezoelectric ring actuator is supported at an intermediate ring arranged between the first deformable lens and the second deformable lens and wherein the second piezoelectric ring actuator is supported at an annular shoulder of a housing of the adaptive lens system.

\* \* \* \* \*